April 3, 1962  J. K. CAMPBELL  3,027,701
FORAGE HARVESTER
Filed Sept. 29, 1959
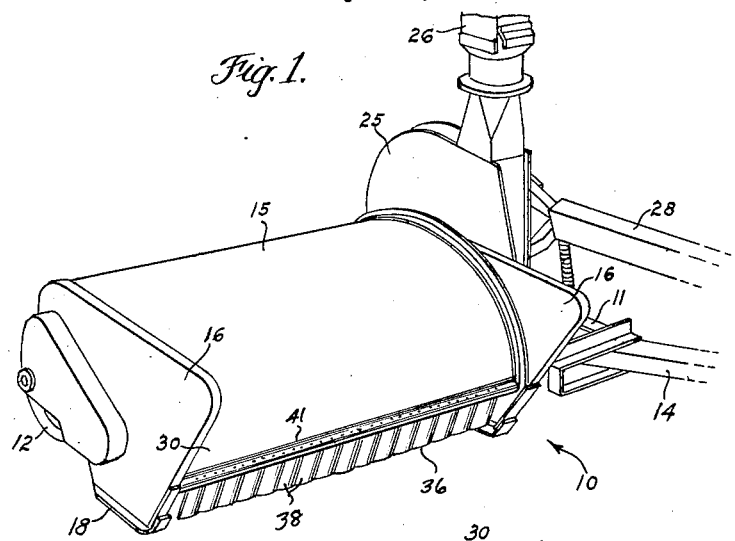
INVENTOR
JOSEPH K. CAMPBELL
By Joseph Allen Brown
ATTORNEY United States Patent Office 3,027,701
Patented Apr. 3, 1962

3,027,701
FORAGE HARVESTER
Joseph K. Campbell, Ephrata, Pa., assignor to Sperry Rand Corporation, New Holland, Pa., a corporation of Delaware
Filed Sept. 29, 1959, Ser. No. 843,086
5 Claims. (Cl. 56—24)

This invention relates to forage harvesters. More particularly, the invention relates to forage harvesters of the flail type. Still more specifically, the invention relates to a shielding device to protect against foreign objects being thrown by the chopper of such a harvester.

A conventional flail type forage harvester has a semi-cylindrical hood opened downwardly. Extending transversely relative to the direction of travel of the harvester and rotatable within the hood is a chopper comprising a shaft having a plurality of radially extending knives which on rotation of the shaft sweep below the hood and cut and chop the standing crop. The knives swing downwardly, forwardly and then upwardly on each working stroke as the shaft rotates. In order to allow the crop material to enter the machine, the hood covering the chopper is vertically spaced from the ground to provide a forwardly disposed inlet opening. The cutter shaft rotates at several thousand r.p.m. and the knives while cutting the crop material have some tendency to pick up from the ground stones and other foreign objects and throw them forwardly. Depending on the throwing angle of such objects, it is possible for an object to be thrown out through the inlet and without coming into engagement with the hood. Once outside the hood, such a flying object might strike the operator or some individual around the machine.

One object of this invention is to provide an inlet shield for a flail type forage harvester to prevent objects from being thrown outwardly from the hood of the chopper and at such an angle that an operator towing the machine might be hit.

Another object of this invention is to provide an inlet shielding structure for a flail type harvester which does not significally impair the entrance of crop material into the machine but will stop the throwing of foreign objects therefrom and in a given direction.

Another object of this invention is to provide an anti-missile shield which is readily bendable rearwardly but resists bending forwardly.

A further object of this invention is to provide a shield of the character described which extends across the inlet opening to a harvester and is readily bendable rearwardly responsive to the crop material entering the machine, the vertical length of the shield being such that when it is in rearwardly bent position it does not pass into the path of travel of the harvester cutter.

Another object of this invention is to provide a shield of the character described which can be manufactured and assembled at relatively low cost.

Other objects of this invention will be apparent hereinafter from the specification and from the recital in the appended claims.

In the drawing:

FIG. 1 is a fragmentary perspective view of a flail type forage harvester having a shield mounted thereon constructed according to this invention;

FIG. 2 is a section through the shield taken on the line 2—2 of FIG. 3 looking in the direction of the arrows and showing the relation of the shield to the chopper mechanism;

FIG. 3 is an enlarged fragmentary front view of the shield;

FIG. 4 is a view of the shield similar to that shown in FIG. 2 but with the shield bent rearwardly to an intermediate position; and FIG. 5 is a perspective view, on an enlarged scale, of one of the shield members.

Referring now to the drawing by numerals of reference and first to FIG. 1, 10 denotes the harvester generally which comprises a frame structure 11 supported on ground wheels, one of which is shown at 12. The frame 11 has a forwardly extending drawbar 14 whereby the implement may be connected to a tractor or the like for towing the harvester.

Mounted on the frame 11 and extending transverse relative to the direction of travel is a semi-cylindrical hood 15 which is opened downwardly. Hood 15 has forwardly projecting side plates 16 the lower portions of which provide ground runners 18. Extending transversely relative to the direction of travel and within the hood 15 is a chopping mechanism 20 (FIG. 2) comprising a rotor or shaft 21 which carries radially extending knives 22. When the machine is viewed from the righthand or outboard side, the chopping mechanism therein rotates in a counterclockwise direction. The knives 22 move so as to generate a theoretical cylinder and in the direction indicated by the dotted line 24.

At one side of the machine, there is mounted a blower housing 25 having a discharge spout 26. Power is derived for operating the chopper 20 and the blower within the housing 25 through conventional power-take-off connections extending through the shield structure 28.

The details of the structure thus far described may be similar to that shown in U.S. Patent No. 2,871,643.

The hood 15 has a downwardly and forwardly extending front portion 30 having a rolled, transverse edge 31 vertically spaced from the ground G (FIG. 2). Edge 31 has an inner portion 32 spaced forwardly from the cylinder 24 generated by chopper 20. The edge is forwardly and upwardly rolled to provide a second portion 34 which projects forwardly. The space between the side plates 16 and between the edge 31 and the ground provides an opening 35 for movement of crop material into the harvester. The rotating knives 22 cut and then throw the standing crop, the hood 15 cooperating to guide the thrown material upwardly and rearwardly and into a transverse auger, not shown, within the upper rearward portion of the hood. The auger conveys the material into the blower housing 25 whereupon the crop material is blown through the discharge spout 26 to a trailing wagon or the like.

When the knives 22 cut off the standing crop, they sometimes engage foreign objects such as stones on the ground. In some instances, such objects will be thrown forwardly with considerable speed. If the trajectory of a given object is low enough, the object may pass beneath the lower edge 31 of the hood and thereby escape the confines of the machine. To prevent injury to the people in and around the machine, a shield 36 constructed according to this invention is provided.

Shield 36 extends all the way across the machine between the two side plates 16. It projects downwardly from the rolled edge 31 a portion of the distance between the edge and the ground. Preferably, the shield comprises a plurality of vertically extending laterally spaced members 38 each of which has a free lower end 39 and an upper end 40 riveted to a mounting bracket 41. The mounting bracket has a portion 42 which is connected to the hood 15 above the edge 31 by means of fasteners 44. The bracket has a downwardly and forwardly extending portion 45 to which the shield members are connected.

Each shield member is constructed as shown best in FIG. 5. When viewed from the front, each member is of generally rectangular configuration being vertically longer than it is wide. The upper end 40 has a pair of holes 46 through which the rivets may be passed to connect the member to the bracket 41. Also as shown, each member is bowed about a vertical plane through generally the center of the member. Thus, the center of the member has greater forward projection than the vertically extending side edges. Preferably, the shield members are made of tire carcass or the like, and constructed so that they offer little resistance to being bent rearwardly when engaged from the front by crop material as the machine moves forwardly. However, each member has a much greater resistance to bending in the opposite direction due to the natural composition of the shields. As a result, the shield structure offers little resistance to incoming material but offers substantial resistance to objects which may be thrown outwardly therefrom.

Under normal circumstances, the various sections of the shield member will bend slighlty rearwardly somewhat as shown in FIG. 4 when the machine is operating. Under extreme conditions, the shield is able to bend rearwardly a maximum amount and extends around the edge 31. However, the downward projection of the shield is such relative to the size of the edge 31 and the space between the edge and the path of travel 24 of the cutter that when the shield is bent rearwardly, as shown in its dotted line position in FIG. 2, the shield does not pass across the path of travel of the knives on the cutter. This prevents the ends of the shield members from being cut up and damaged by the chopper knives.

Since the shield as a whole is mounted on the bracket 41 the structure can be easily added to or removed from a machine as a unit. Moreover, since the shield comprises a plurality of independently mounted shield members, if any given shield member is damaged or torn loose for one reason or another, it can be replaced without having to change any of the other members. Further since each shield member operates independently of the other shield member, one or more of the members may be bent rearwardly at a given time while the others project in normal position.

Any object thrown by the knives 22 must have a trajectory no higher than the dotted line 48 in FIG. 2. Otherwise, the object will strike a given shield member and then merely drop to the ground. Objects thrown at a lower trajectory offer little hazard since they move into the crop material entering the machine and are thereby stopped. The upwardly thrown objects, which can be more dangerous, are blocked by the shield or the hood 15. The shielding structure is simple and low cost and it adds very little to the ultimate overall cost of the harvester.

While this invention has been described in connection with a particular embodiment thereof, it will be understood that it is capable of further modification, and this application is intended to cover any variations, uses or adaptations of the invention following in general, the principles of the invention and including such departures from the present disclosure as come within known or customary practice in the art to which the invention pertains and as fall within the scope of the invention or the limits of the appended claims.

Having thus described my invention, what I claim is:

1. A forage harvester having a mobile frame, a hood mounted on said frame, a cutting mechanism mounted on said frame within said hood and rotatable about an axis transverse to the line of travel of said frame, said cutting mechanism having a plurality of knives which swing downwardly forwardly and then upwardly on each cutting stroke and exert a forward and upward throwing force on cut material, said hood having a forward transverse edge spaced from the ground and thereby providing an opening through which crop material may enter the hood on forward travel of said frame for engagement by said cutting mechanism, and safety means providing a given resistance to the passage of objects forwardly through said opening while offering a substantially smaller resistance than said given resistance to the passage of crop material rearwardly through said opening, said safety means comprising a resilient shield mounted on said hood and having a normal position wherein it extends downwardly from said transverse edge toward the ground, said shield having a plurality of laterally spaced vertically extending members each of which is bowed forwardly about a vertical axis whereby each member is readily swingable rearwardly and relatively resistant to swinging forwardly.

2. A forage harvester as recited in claim 1 wherein said shield members are separate from each other and fastened to a common mounting bracket, said bracket being attached to said hood.

3. A forage harvester as recited in claim 1 wherein said transverse edge of said hood is rolled and projects forwardly, said shield engaging the forward portion of said edge.

4. A forage harvester as recited in claim 3 wherein said edge is spaced forwardly from said cutting mechanism, and the amount of downward extension of said shield is such relative to the space between said edge and the mechanism and the forward projection of the edge that when the shield swings rearwardly it passes clear of the mechanism.

5. A forage harvester as recited in claim 2 wherein said mounting bracket has a first portion connected to said hood above said edge and second portion which extends downwardly and forwardly therefrom, said shield members being interposed between said edge and said second portion and being fastened to said second portion.

References Cited in the file of this patent

UNITED STATES PATENTS

| | | |
|---|---|---|
| 2,661,493 | Joy | Dec. 8, 1953 |
| 2,743,567 | Martin | May 1, 1956 |
| 2,836,021 | Wood et al. | May 27, 1958 |
| 2,841,946 | Skromme | July 8, 1958 |